US008373838B2

(12) United States Patent
Tang

(10) Patent No.: US 8,373,838 B2
(45) Date of Patent: Feb. 12, 2013

(54) DISPLAY APPARATUS

(75) Inventor: Pao-Yun Tang, Taoyuan County (TW)

(73) Assignee: Hannstar Display Corporation, New Taipei (TW)

( * ) Notice: Subject to any disclaimer, the term of this patent is extended or adjusted under 35 U.S.C. 154(b) by 1504 days.

(21) Appl. No.: 11/930,124

(22) Filed: Oct. 31, 2007

(65) Prior Publication Data

US 2009/0058774 A1    Mar. 5, 2009

(30) Foreign Application Priority Data

Aug. 29, 2007   (TW) ................................ 96131999 A

(51) Int. Cl.
*G02F 1/1345*    (2006.01)
(52) U.S. Cl. ........................................ 349/152; 349/149
(58) Field of Classification Search .................. 349/149, 349/150, 139, 151, 152
See application file for complete search history.

(56) References Cited

U.S. PATENT DOCUMENTS

| 5,488,498 | A  | * | 1/1996 | Fujii et al. ...................... 349/149 |
| 6,839,120 | B2 | * | 1/2005 | Choo et al. ..................... 349/152 |
| 2004/0179146 | A1 | * | 9/2004 | Nilsson ........................... 349/49 |
| 2006/0103410 | A1 | * | 5/2006 | Jeon ............................. 324/770 |
| 2007/0002256 | A1 | * | 1/2007 | Kim .............................. 349/150 |

OTHER PUBLICATIONS

"Office Action of Taiwan Counterpart Application", issued on Aug. 23, 2011, p. 1-p. 6.

* cited by examiner

Primary Examiner — Edward Glick
Assistant Examiner — David Chung
(74) Attorney, Agent, or Firm — Jianq Chyun IP Office

(57) ABSTRACT

A display apparatus includes a substrate, a daisy chain, a driving circuit, and a conductive portion. The substrate has an electrode line. The daisy chain includes a first conducting wire separated from the electrode line. The first conducting wire has a first terminal and a second terminal. The conductive portion is disposed on the substrate. The first terminal is electrically connected to the electrode line and the second terminal is separated from the driving circuit.

16 Claims, 6 Drawing Sheets

__US 8,373,838 B2__

DISPLAY APPARATUS

CROSS-REFERENCE TO RELATED APPLICATION

This application claims the priority benefit of Taiwan application serial no. 96131999, filed on Aug. 29, 2007. All disclosure of the Taiwan application is incorporated herein by reference.

BACKGROUND OF THE INVENTION

1. Field of the Invention

The present invention relates to a display apparatus. More particularly, the present invention relates to a display apparatus designed with a daisy chain.

2. Description of Related Art

As the optoelectronic technology and semiconductor manufacturing technology have become increasingly mature, flat panel displays are developed rapidly. Among others, LCDs, advantageous in low-voltage operation, no radiation, low weight, and small volume, has gradually replaced conventional CRT displays to become a mainstream display product in recent years.

Generally speaking, a LCD panel is mainly constituted by a substrate, an opposite substrate, and a liquid crystal layer disposed between the above two substrates. FIG. 1 is a top view of a substrate of a conventional LCD panel. The conventional LCD panel is provided with a substrate 110, a FPC (flexible printed circuit) 120, and a PCB (printed circuit board) 130. The substrate 110 has an active region A and a peripheral circuit region B located outside the active region A. Pixel units P are disposed in the active region A, and the first driving circuits 170, an electrode line 112, and conductive portions 114 are disposed in the peripheral circuit region B. The electrode line 112 is disposed surrounding the active region A. The conductive portions 114 are made of a conductive material, for example, a mixture of conductive particles and an adhesive.

The FPC 120 has second driving circuits 171. As shown in FIG. 1, the electrode line 112 is electrically connected to the PCB 130 through the FPC 120, for transmitting a common voltage. Generally speaking, after the assembly of the substrate 110 and an opposite substrate (not shown), a counter electrode on the opposite substrate is electrically connected to the electrode line 112 through the conductive portions 114, such that the common voltage may be transmitted to the counter electrode of the opposite substrate.

According to the technology of the conventional LCD panel, if the electrode line 112 is broken or has defects, the common voltage may not be uniformly transmitted to each point on the counter electrode, thus causing the LCD panel to display an abnormal frame. Moreover, the counter electrode may have an abnormal voltage since the conductive material of the conductive portions 114 is insufficient or many bubbles distribute over the conductive portions 114, and it is hard to find out which one of the conductive portions 114 has problem.

SUMMARY OF THE INVENTION

Accordingly, the present invention provides a display apparatus including a substrate, a daisy chain, a driving circuit, and a conductive portion. The substrate has an electrode line. The daisy chain includes a first conducting wire separated from the electrode line. The first conducting wire has a first terminal and a second terminal. The conductive portion is disposed on the substrate. The first terminal is electrically connected to the electrode line and the second terminal is separated from the driving circuit.

In order to make the present invention comprehensible, embodiments accompanied with figures are described in detail below.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
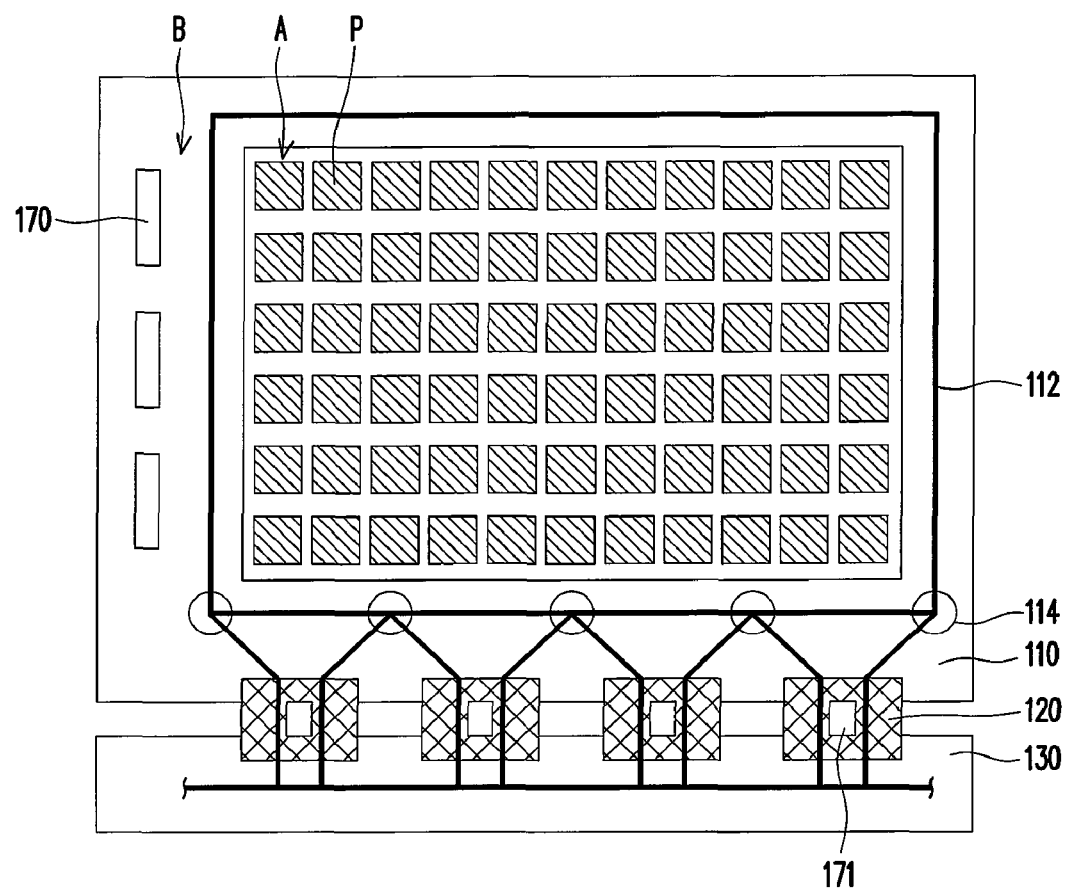
FIG. 1 is a top view of a substrate of a conventional LCD panel.
Figure 2A:
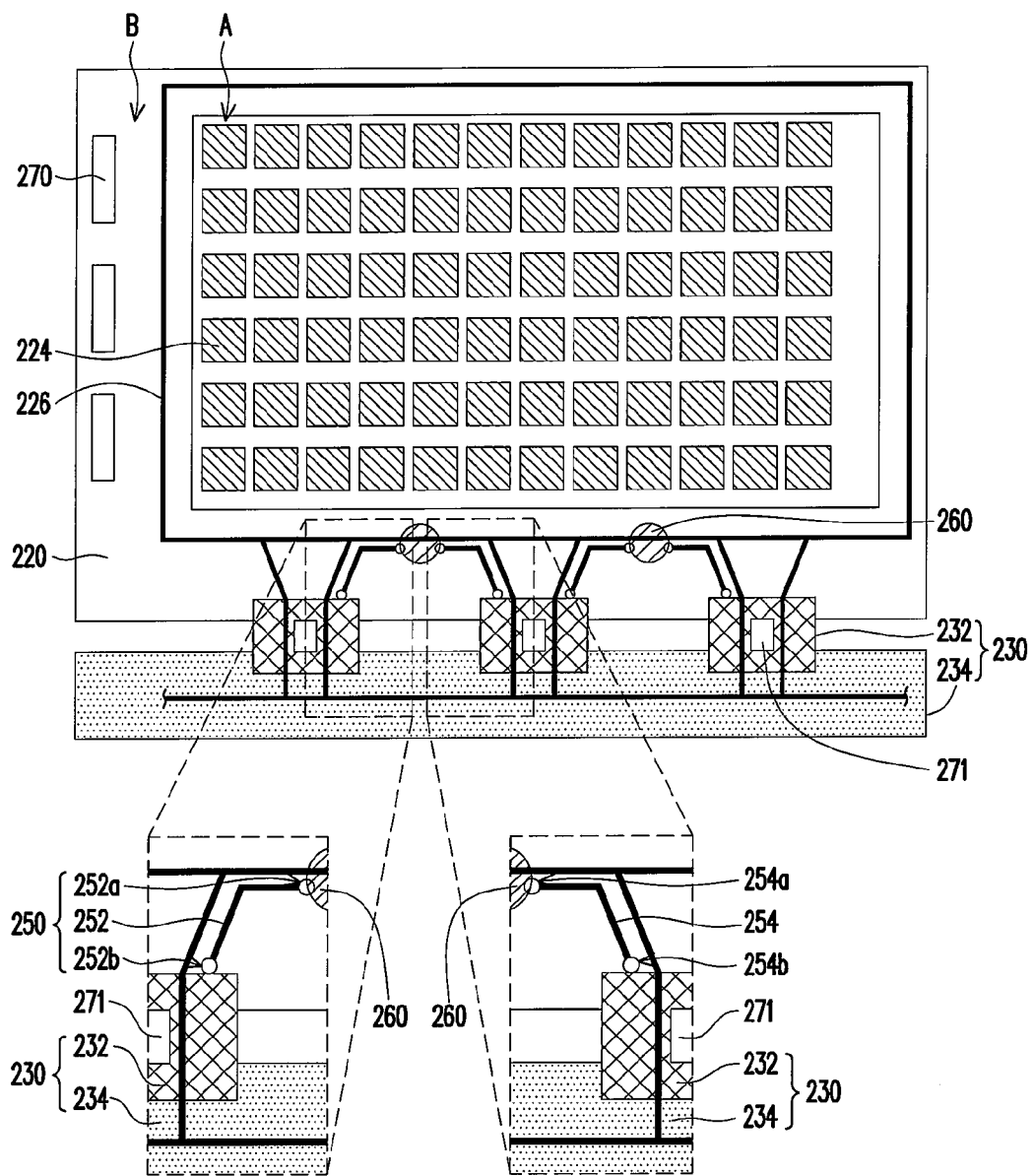
FIG. 2A is a top view of a substrate and an external circuit board according to the present invention.

FIG. 2A is a schematic view of a display apparatus according to the present invention. The substrate 220 is connected to an external circuit board 230. The external circuit board 230 includes a FPC 232 and a PCB 234. The FPC 232 has a second driving circuit 271, for example, a driving IC or a pad, and is connected to the substrate 220 and the PCB 234 respectively.

The substrate 220 has an active region A, a peripheral circuit region B located on the periphery of the active region A, at least one pixel unit 224, at least one first driving circuit 270, an electrode line 226, and a daisy chain 250. The pixel unit 224 is disposed in the active region A. The electrode line 226 is disposed in the peripheral circuit region B and surrounds the active region A. The first driving circuit 270 is, for example, a driving IC or a pad.

Further, the daisy chain 250 of this embodiment includes a first conducting wire 252 and a second conducting wire 254, and both of the first and second conducting wires 252, 254 are located in the peripheral circuit region B. The first conducting wire 252 has a first and second terminal 252a, 252b, and the second conducting wire 254 has a first and second terminal 254a, 254b. The first terminals 252a, 254a are separated or spaced from the electrode line 226 by a distance, and have a portion overlapped with a conductive portion 260. The first terminals 252a, 254a are electrically connected to each other through the conductive portion 260, or electrically connected to the electrode line 226 through the conductive portion 260. The conductive portion 260 may be made of merely a conductive material, or a mixture of a conductive material and a non-conductive material, for example, a mixture of gold paste and sealant.

Figure 3A:
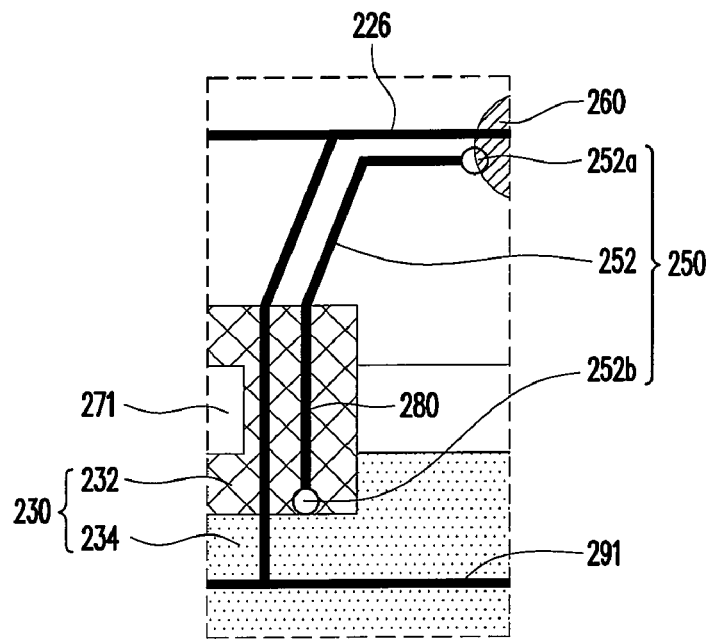
FIG. 3A illustrates a position of a second terminal according to an embodiment of the present invention.
Figure 3B:
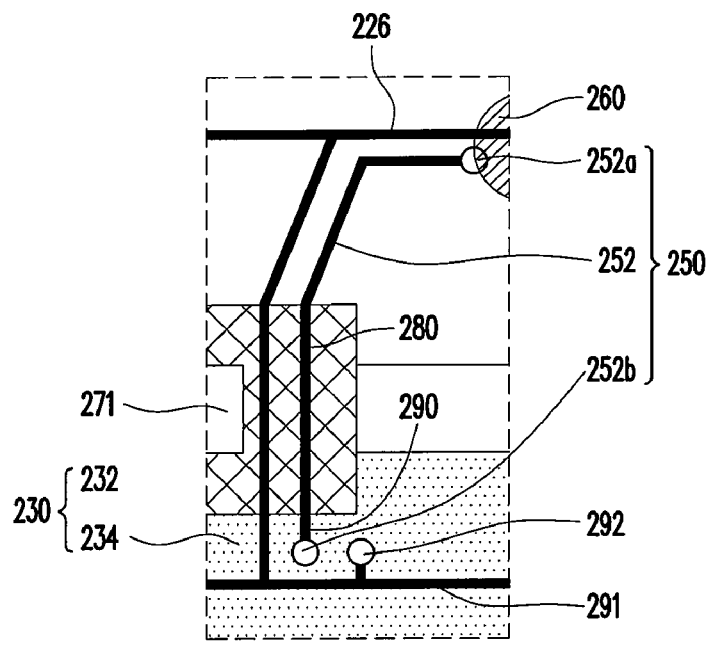
FIG. 3B is a schematic view of another position of a second terminal according to the present invention.

The second terminals 252b, 254b of the first conducting wire 252 and the second conducting wire 254 are located on the substrate 220, and the positions of the second terminals 252b, 254b may be adjusted according to actual requirements. As shown in FIG. 3A, the first conducting wire 252 is connected to the third conducting wire 280, wherein the third conducting wire 280 and the second terminal 252b are located on the FPC 232. As shown in FIG. 3B, the first conducting wire 252, the third conducting wire 280, and the fourth conducting wire 290 are connected together, wherein the fourth conducting wire 290 and the second terminal 252b are located on the PCB 234. Further, as shown in FIG. 2A, the second terminals 252b, 254b are separated from the first driving circuit 270 and the second driving circuit 271.

Figure 2B:
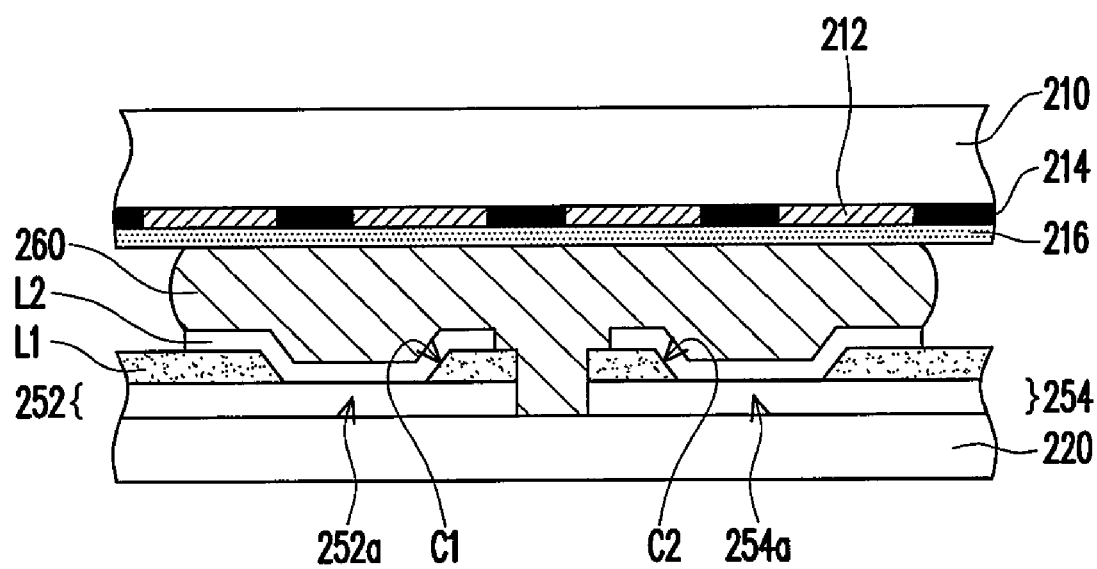
FIG. 2B is a sectional view showing the part of the assembly of a substrate and an opposite substrate according to the present invention.

Referring to FIG. 2B, the opposite substrate 210 has a color filter 212, a black matrix 214, and a counter electrode 216. The counter electrode 216 is electrically connected to the first terminals 252a, 254a through the conductive portion 260. That is, after the assembly of the opposite substrate 210 and the substrate 220, the conductive portion 260 is electrically connected to the counter electrode 216 of the opposite substrate 210 and the electrode line 226 of the substrate 220, as shown in FIG. 2A.

In FIG. 2B, a first protection layer L1, made of a dielectric material, is disposed on the first conducting wire 252 and the second conducting wire 254. The first protection layer L1 has contact holes C1, C2, respectively expose the first terminals 252a, 254a. Generally speaking, in order to improve the reliability of the first and second conducting wires 252, 254, a second protection layer L2, made of a conductive material like ITO, is formed on the first terminals 252a, 254a.

In general, the PCB 234 transmits the common voltage to the counter electrode 216 of the opposite substrate 210 through the FPC 232, the electrode line 226, and the conductive portion 260 in sequence.

It should be noted that the second terminals 252b, 254b may be measuring points. The operators can measure a voltage state between the second terminals 252b, 254b with a measuring instrument to determine whether the distribution of the voltage of the electrode line 226 or the counter electrode 216 is uniform. For example, when it is found that the voltage of the electrode line 226 is unstable through measurement, the operators can make the second terminals 252b, 254b electrically connect to a pad 292 of the external circuit board 230 by a surface mount device. The pad 292 is connected to a power line 291, and the power line 291 is connected to a voltage source, as shown in FIG. 3B, so as to restore the voltage of the electrode line 226.

The non-uniform distribution of the voltage of the counter electrode 216 is mainly caused by a bad contact between the conductive portion 260 and the counter electrode 216 on the opposite substrate 210.

Figure 4:
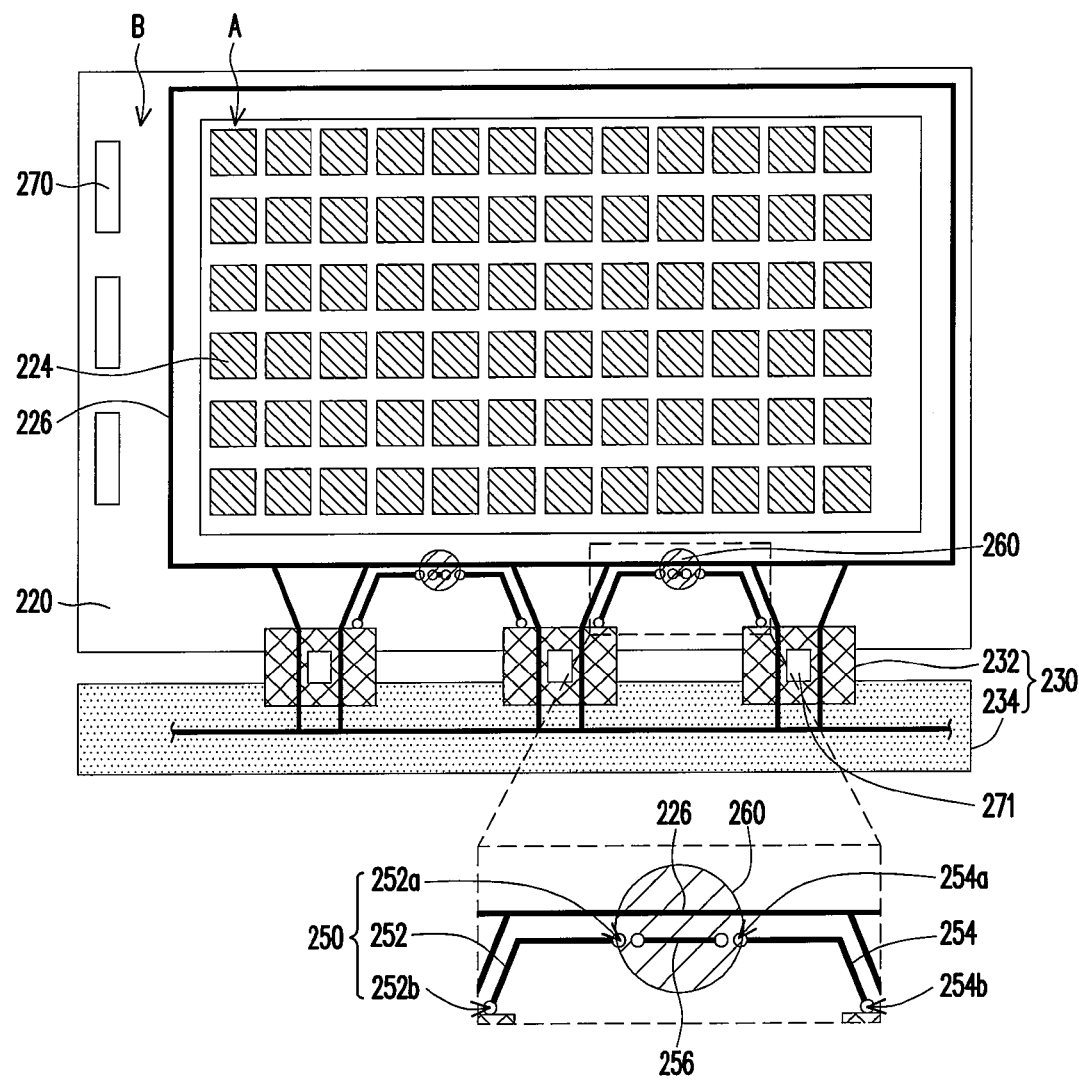
FIG. 4 is a schematic view of another layout of the daisy chain according to the present invention.

FIG. 4 is a schematic view of another layout of the daisy chain according to the present invention. Referring to FIG. 4, a connection conducting wire 256 is further disposed between the first conducting wire 252 and the second conducting wire 254. The connection conducting wire 256 is separated from the first conducting wire 252 and the second conducting wire 254. Moreover, the first conducting wire 252 is electrically connected to the connection conducting wire 256 and the second conducting wire 254 in sequence through the conductive portion 260.

Figure 5:
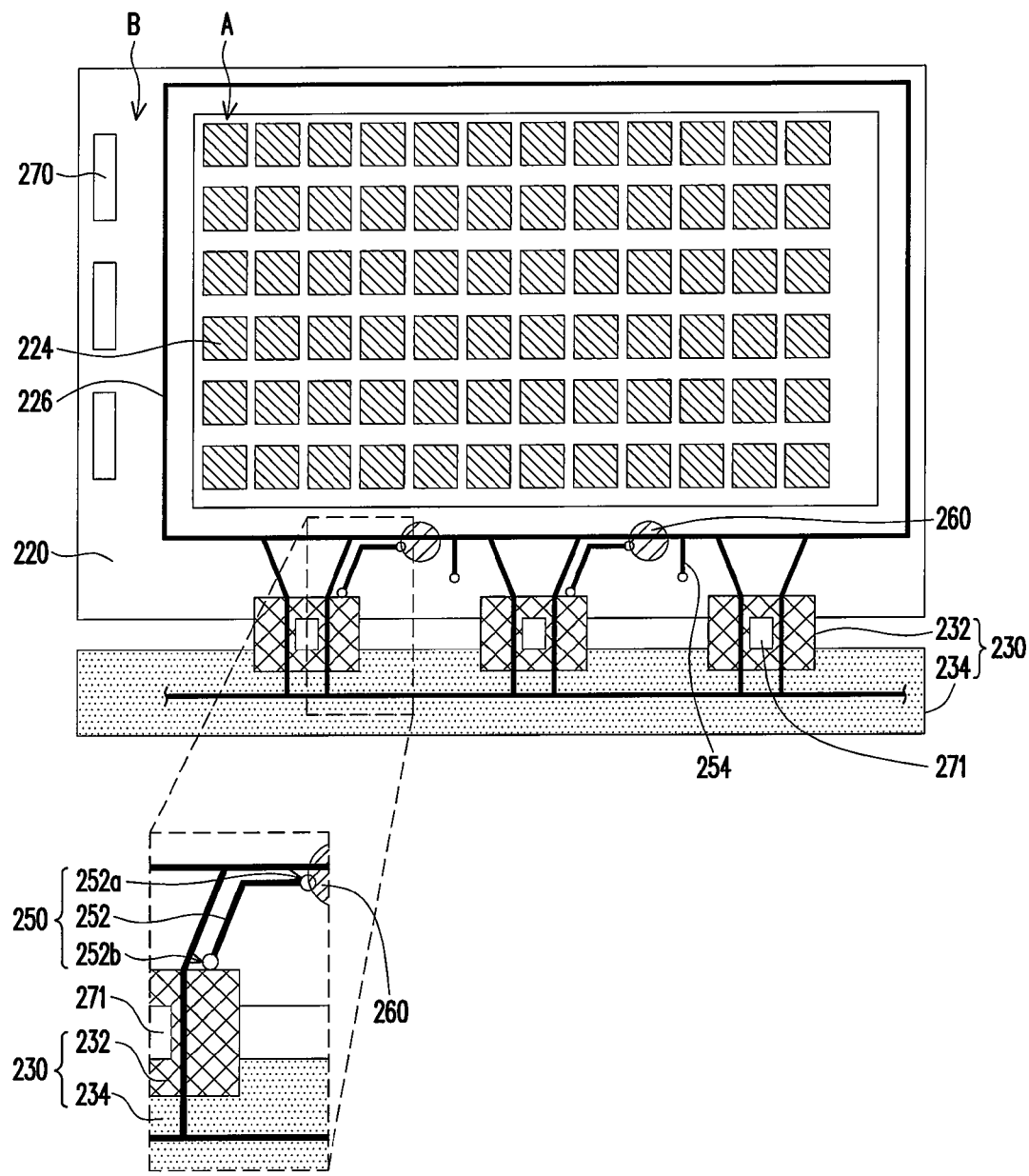
FIG. 5 is a schematic view of another layout of the second conducting wire according to the present invention.

FIG. 5 is a schematic view of another layout of the second conducting wire according to the present invention. Referring to FIG. 5, the first conducting wire 252 is separated from the electrode line 226, and the second conducting wire 254 extends from the electrode line 226 and is separated from the first conducting wire 252. The first conducting wire 252 is electrically connected to the electrode line 226 and the second conducting wire 254 in sequence through the conductive portion 260.

In view of the above, the display apparatus of the present invention has a daisy chain so as to provide test points for electric measurement, thereby determining whether the conductive portion is abnormal or not and finding out the position where the abnormality occurs. Further, when the voltage of a conductive portion becomes abnormal due to the circuit delay of the electrode line, the operators can make the second terminal electrically connect to an external circuit board, so as to restore the voltage of the electrode line, such that the common voltage is uniformly distributed to improve the display quality of the display apparatus.

Though the present invention has been disclosed above by the preferred embodiments, they are not intended to limit the present invention. Those of ordinary skill in the art can make some modifications and variations without departing from the spirit and scope of the present invention. Therefore, the protecting range of the present invention falls in the appended claims.

What is claimed is:

1. A display apparatus, comprising:
   a substrate having a common electrode line;
   a daisy chain having a first conducting wire and a second conducting wire both separated from the electrode line, wherein the first conducting wire, the second conducting wire and the common electrode line are formed in a same layer and not multilayered;
   a driving circuit; and
   a conductive portion disposed on the substrate and electrically connected to the common electrode line;
   wherein first terminals of the first conducting wire and the second conducting wire are electrically connected to the common electrode line via only the same conductive portion, and second terminals of the first conducting wire and the second conducting wire are separated from the driving circuit,
   wherein the conductive portion comprises a non-conductive material.

2. The display apparatus as claimed in claim 1, wherein the driving circuit is disposed on the substrate.

3. The display apparatus as claimed in claim 1, further comprising an opposite substrate having a counter electrode.

4. The display apparatus as claimed in claim 3, wherein the counter electrode is electrically connected to the common electrode line.

5. The display apparatus as claimed in claim 3, wherein the conductive portion is electrically connected to the counter electrode.

6. The display apparatus as claimed in claim 1, wherein the first conducting wire is electrically connected to the second conducting wire through the conductive portion.

7. The display apparatus as claimed in claim 1, wherein the conductive portion is electrically connected to the common electrode line.

8. The display apparatus as claimed in claim 1, further comprising a flexible printed circuit connected to the substrate and having a third conducting wire electrically connected to the first conducting wire.

9. The display apparatus as claimed in claim 8, wherein the driving circuit is disposed on the flexible printed circuit.

10. The display apparatus as claimed in claim 8, further comprising a printed circuit board connected to the flexible printed circuit and having a fourth conducting wire electrically connected to the third conducting wire.

11. The display apparatus as claimed in claim 10, wherein the printed circuit board has a power line electrically connected to fourth conducting wire.

12. A display apparatus, comprising:
   a substrate having an active region, a peripheral circuit region, and a common electrode line;
   a daisy chain disposed on the peripheral circuit region and having a first conducting wire and a second conducting wire separated from the first conducting wire, wherein the first conducting wire and the second conducting wire are separated from the common electrode line, and the first conducting wire, the second conducting wire and the common electrode line are formed in a same layer and not multilayered; and
   a conductive portion electrically connected to the common electrode line;
   wherein the first conducting wire and the second conducting wire are electrically connected to the common electrode line via only the same conductive portion, and are partially overlapped and contacted with the conductive portion,
   wherein the conductive portion comprises a non-conductive material.

13. The display apparatus as claimed in claim 12, wherein the first conducting wire is electrically connected to the second conducting wire through the conductive portion.

14. The display apparatus as claimed in claim 12, further comprising a connection conducting wire separated from and disposed between the first conducting wire and the second conducting wire.

15. The display apparatus as claimed in claim 14, wherein the conductive portion is electrically connected to the connection conducting wire.

16. The display apparatus as claimed in claim 12, further comprising a power line electrically connected the daisy chain.

* * * * *